United States Patent [19]
Thomas, Jr.

[11] 4,214,682
[45] Jul. 29, 1980

[54] NON-LEAKING PUMP SPRAY VALVE

[76] Inventor: Thomas A. Thomas, Jr., 4100 SW. 58th Ter., Davie, Fla. 33314

[21] Appl. No.: 809,081

[22] Filed: Jun. 23, 1977

[51] Int. Cl.$^2$ .............................................. G01F 11/02
[52] U.S. Cl. .................................... 222/321; 222/384
[58] Field of Search ............... 222/321, 384, 562, 385; 239/333

[56] References Cited

U.S. PATENT DOCUMENTS

| | | | |
|---|---|---|---|
| 544,143 | 8/1894 | Wagner | 222/321 X |
| 904,149 | 11/1908 | Rachmann | 222/321 X |
| 3,991,914 | 11/1976 | Kotuby et al. | 222/321 |

*Primary Examiner*—Robert J. Spar
*Assistant Examiner*—Frederick R. Handren
*Attorney, Agent, or Firm*—Joseph Zallen

[57] ABSTRACT

A non-leaking pump spray valve having a dispensing plunger which is vertically movable so as to depress or raise a sealing disc which is preferably flexible and of a flap type.

4 Claims, 8 Drawing Figures

NON-LEAKING PUMP SPRAY VALVE

SUMMARY OF INVENTION

This invention relates to a non-leaking pump spray valve and in particular to such a valve which is inexpensive, well-sealed in resting position and not easily operable by children.

The invention in its most general form comprises a cap assembly cooperable with the mouth of a container and including a fluid reservoir and a pump member. The pump member contains a central conduit leading to an outlet orifice near the top of the pump member. The pump member is normally kept in an upper position by a spring in which position connection between the pump conduit and the reservoir is blocked. Depression of the pump member permits connection between the reservoir and the pump conduit and at the same time permits air to come in from the container into the upper part of the reservoir.

In one form of the invention a flexible flap-type sealing disc is positioned on top of the spring and acts to both seal the reservoir from leakage whether elevated or depressed, but also blocks communication between the reservoir and the pump conduit as well as the vent to the container.

In another form of the invention the pump member is covered by a shell which must be rotated to align with the vertical slot in order to operate the pump member.

In another form of this invention the pump member is engageable by threading with the body of the cap and must be unthreaded before it can function.

In still another form of the invention a threaded cap is provided for the top of the piston member which can be supplemented by a ball valve.

All of these features contribute to making the pump spray valve of this invention not only leak-proof but also difficult to be operated by children.

SPECIFIC EXAMPLES OF INVENTION

Figure 1:
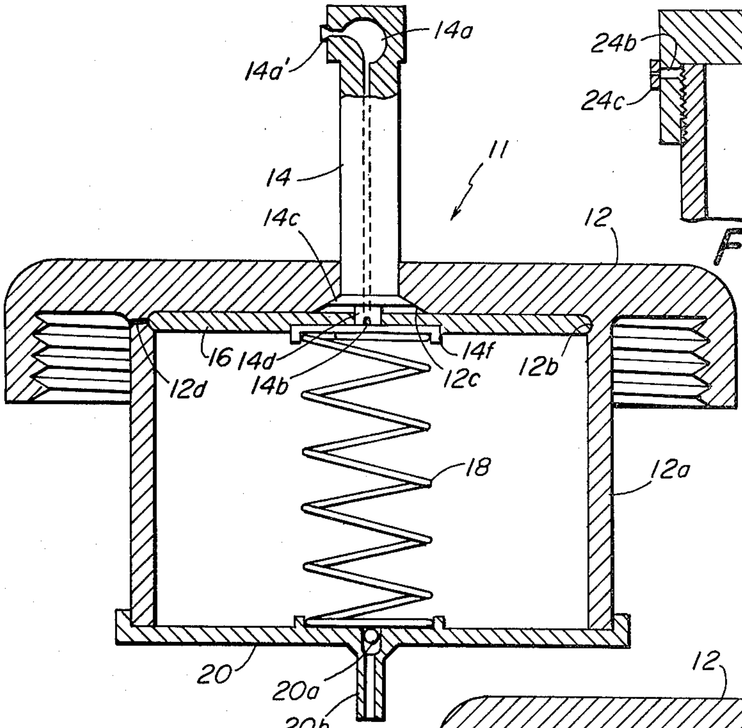
FIG. 1 is a sectional view through a dispensing assembly made in accordance with this invention.

The dispensing assembly 11 comprises a cap portion 12 having a depending threaded outlet rim which is cooperative with the mouth of a threaded container. Integral with the cap portion is a cylindrical central depending dispensing reservoir **12*a* having a bottom wall 20. Extending through central orifice in the cap portion 12 is a dispensing plunger 14 which is vertically movable so as to depress a flexible flap-type sealing disc 16. Disc 16 is slightly larger than the dispensing reservoir 12*a* and acts so as to apply pressure on the volume below it within the reservoir. A spring 18 acts to return the sealing disc 16 after downward pressure on plunger 14** has been released.

An indentation is provided in the upper portion of reservoir **12*a* so that in its elevated position disc 16 blocks a side orifice 12*d* leading into the interior of the container. Disc 16 also has a central orifice through which the terminal block 14*d* can extend down into the chamber below disc 16 and thus permit the contents to be expelled through orifice 14*b* up through the central passageway of plunger 14 in an outlet orifice 14*a*'. The plunger 14 in its upper position is held against an offset 12*c***.

The lower wall 20 of the dispensing reservoir **12*a* has a conduit 20*b* regulated by a ball valve 20*a*. When the plunger is up the ball 20*a* normally floats freely. However when the plunger 14 is depressed the pressure on the fluid within the reservoir 12*a* causes the ball 28 to seat and block any further connection through conduit 20*b*** with the contents of the container.

Accordingly, the action of the device is as follows.

Repeated depressing of the plunger 14 causes the device to act as a pump pulling up fluid through conduit **20*b* into the reservoir 12*a*. After sufficient fluid is accumulated in reservoir 12*a* further pumping of the piston 14 acts to force the fluid accumulated in the reservoir 12*a* through orifice 14*b* up to outlet 14*a*'. At the same time displacement air enters the container through orifice 12*d* thus permitting fluid to enter the reservoir through conduit 20*b*** on the return stroke.

It is clearly apparent that this device is leakproof in any orientation and would clearly not leak or spill if turned over by a child. Further, unless the child applied pressure in the proper direction none of the contents of the container would be dispensed.

Figure 1A:
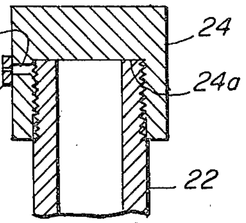
FIG. 1A is a modification of the upper portion of FIG. 1.
Figure 1B:
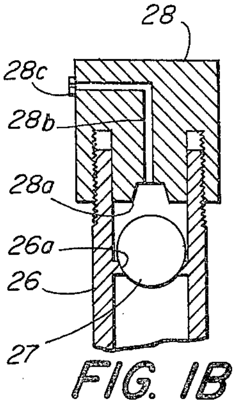
FIG. 1B is another modification of the upper portion of FIG. 1.
Figure 2:
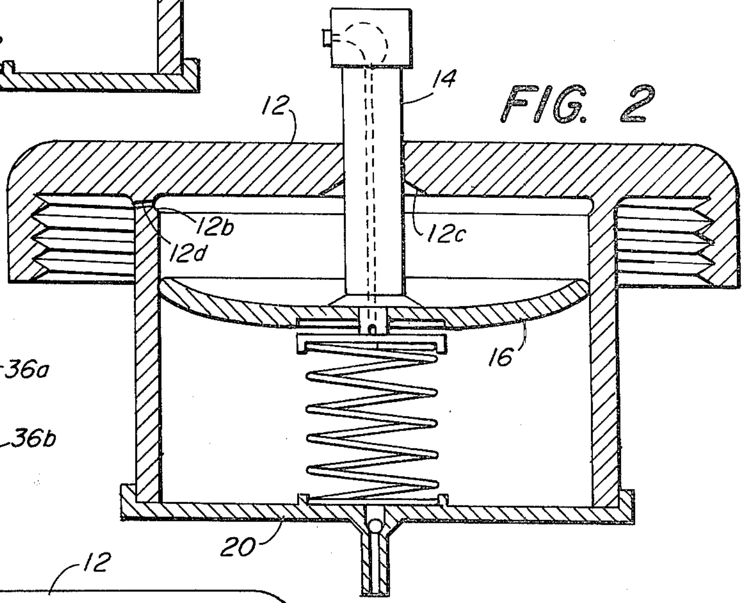
FIG. 2 is a similar view of the dispensing assembly of FIG. 1 but showing the plunger depressed.

As a further insurance against leaking FIG. 1B shows a portion of the head of the pump wherein the head 28 has a conduit **28*b* leading to an outlet orifice 28*c* and connecting with a wide mouth 28*a* leading into a chamber. A ball valve 27 sits in a valve orifice 26*a* at the top of the conduit 26** which leads to the container.

Figure 3A:
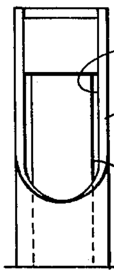
FIG. 3A is a partial rear view of FIG. 3.
Figure 3:
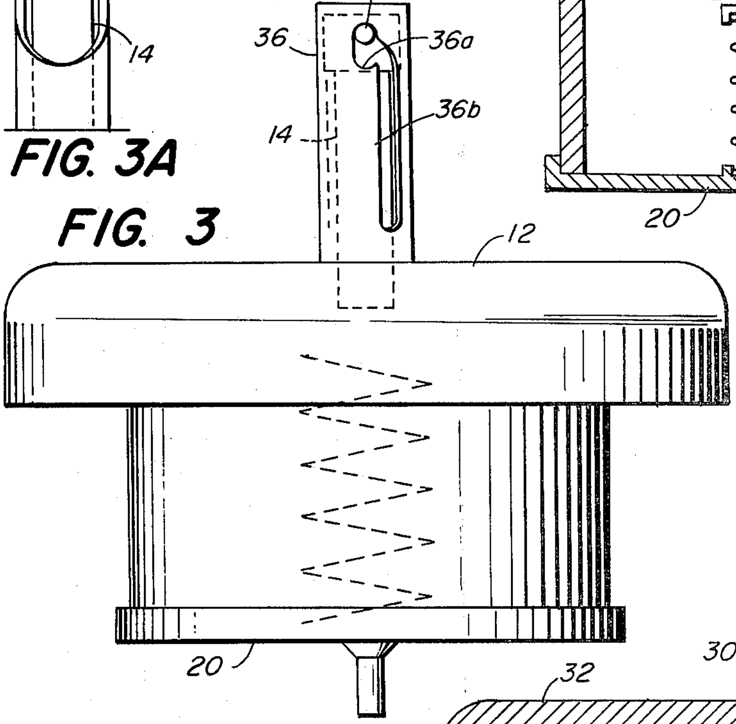
FIG. 3 is a view of another modification of the upper portion of the device illustrated in FIG. 1.

In another version as shown in FIGS. 3 and 3A a shell 36 extending around one side of the pump and having a slot **36*b* with an offset portion 36*a* cooperates with the orifice 14*a*' in the following manner. The shelf blocks the depression of the pump unless the outlet orifice 14*a*' which projects through the head can be moved downward through the vertical slot 36*b* of the head. This can only be accomplished by lifting and turning the shell 36, or depressing and turning dispensing plunger 14**. This is thus an additional feature to prevent inadvertent operation of the device.

Figure 4A:
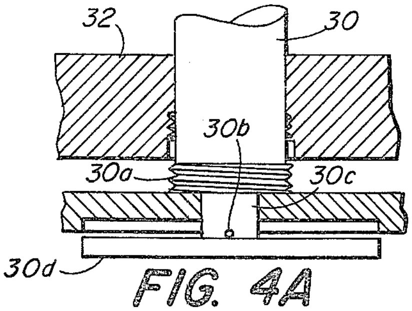
FIG. 4A is an enlargement of a portion of FIG. 4.
Figure 4:
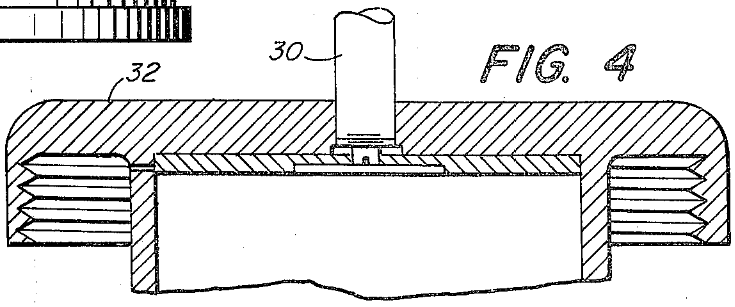
FIG. 4 is a partial sectional view of still another variation of the invention.

Further safety locking feature is achieved as shown in FIGS. 4 and 4A where the piston 30 has lower terminal threading **30*a* which must be given a few turns in order to permit the piston to be sufficiently depressed so as to permit connection between the reservoir and the conduit leading to the outlet orifice. Attached to the bottom of the piston below the threading is an extension 30*c* having a transverse orifice 30*b* and terminating in a disc 30*d***, the latter acting on the spring.

Another modification which can be incorporated into the top portion of the plunger is illustrated in FIG. 1A. A threaded cap 24 having a side conduit **24*b* and an outlet orifice 24*c* is shown in position on top of pump member 72 which has a central conduit, so as to effectively block any explosion of fluid. By unscrewing of cap 24** partially an upper chamber connecting the conduit 24*b* to the pump conduit 22 is formed, thus permitting expulsion of the fluid contents.

I claim:

1. A non-leaking pump spray device comprising in combination:

(a) A cap portion (12) cooperable with the mouth of a container and having a central orifice with a lower wider portion (12*c*);

(b) a fluid reservoir (12*a*) depending from said cap portion (12) and having an upper lateral groove (12*b*) in its wall and an air orifice (12*d*) registerable with said groove;

(c) a pump member (14) extending through said cap portion (12) and into said reservoir (12*a*) and comprising a central conduit, an upper outer orifice (14*a*'), a lower lateral extension (14*c*) registerable with said lower wider portion (12*c*), a lower central extension (14*d*) having an orifice (14*b*) connecting with said central conduit and a lower terminal lateral extension (14*f*);

(d) a flexible sealing disc (16) wider than the inner diameter of reservoir (12*a*), registerable with said groove (12*b*) so as to block orifice (12*d*) and slidably movable on extension (14*d*) of pump member (14);

(e) spring means (18) between the bottom wall (20) of said reservoir (12*a*) and said lower terminal extension (14*f*) of said pump member (14) normally urging disc (16) upward;

(f) a lower opening (20*b*) in said reservoir;

(g) valve means (20*a*) in said lower opening (20*b*); said device being so constructed that in normal undepressed condition, said sealing disc blocks said air orifice (12*d*) and said inlet orifice (14*b*) from communication with the interior of said reservoir (12*a*) but when said pump member is depressed is carries said sealing disc to unblock said air orifice (12*d*) and said inlet orifice (14*b*).

2. The pump spray valve of claim 1 wherein ball valve means (27) are spaced between the central conduit and the upper outlet orifice (14*a*'.

3. The pump spray valve of claim 1 wherein the pump member (14) is covered by a partial shell having a slot and offset portion (36*a*) which blocks the depression of the pump unless the outlet orifice can be moved downward through the slot.

4. The pump spray valve of claim 1 wherein a threadable cap member (24 is provided on the upper portion of the central conduit.

* * * * *